United States Patent [19]

Spötzl

[11] 4,422,216

[45] Dec. 27, 1983

[54] DEVICE FOR SEPARATING MEAT FROM BONES

[76] Inventor: Markus Spötzl, Forstenrieder Allee 128 b, D-8000 München 71, Fed. Rep. of Germany

[21] Appl. No.: 340,962

[22] Filed: Jan. 20, 1982

Related U.S. Application Data

[63] Continuation-in-part of Ser. No. 170,445, Jul. 21, 1980, abandoned.

[30] Foreign Application Priority Data

Jul. 23, 1979 [DE] Fed. Rep. of Germany ....... 2929836
Jan. 21, 1981 [DE] Fed. Rep. of Germany ....... 3101842

[51] Int. Cl.³ .............................................. A22C 17/04
[52] U.S. Cl. ..................................... 17/1 G; 30/380; 83/651.1; 83/661; 17/46
[58] Field of Search ................. 17/1 G, 46, 66, 67, 17/18, 19; 30/380, 166; 83/661, 651.1

[56] References Cited

U.S. PATENT DOCUMENTS

| | | | |
|---|---|---|---|
| 2,432,459 | 12/1947 | Timmerman | 17/18 |
| 2,696,228 | 12/1954 | Bowen | 30/166 X |
| 3,750,284 | 8/1973 | Swift | 30/380 |
| 4,199,840 | 4/1980 | Crane | 17/1 G X |
| 4,258,763 | 3/1981 | Figueredo et al. | 30/166 R X |
| 4,273,169 | 6/1981 | Baenen | 83/651.1 X |

FOREIGN PATENT DOCUMENTS

| | | | |
|---|---|---|---|
| 463554 | 8/1928 | Fed. Rep. of Germany | 17/19 |
| 470211 | 1/1929 | Fed. Rep. of Germany | 17/19 |
| 561246 | 10/1932 | Fed. Rep. of Germany | 17/1 G |
| 2201561 | 7/1973 | Fed. Rep. of Germany | 17/1 G |
| 54-21692 | 2/1979 | Japan | 83/651.1 |

*Primary Examiner*—Willie G. Abercrombie
*Attorney, Agent, or Firm*—Allison C. Collard; Thomas M. Galgano

[57] ABSTRACT

A device for separating meat from bones includes a flexible cutting strand driven continuously or in a reciprocating manner by a drive. The cutting strand is unsupported over a portion of its length so that it can engage the surface of a bone in this area under the influence of a force exerted on the device. The cutting strand is provided with cutting elements spaced apart from each other which have cutting edges extending in the longitudinal direction of the cutting strand.

9 Claims, 15 Drawing Figures

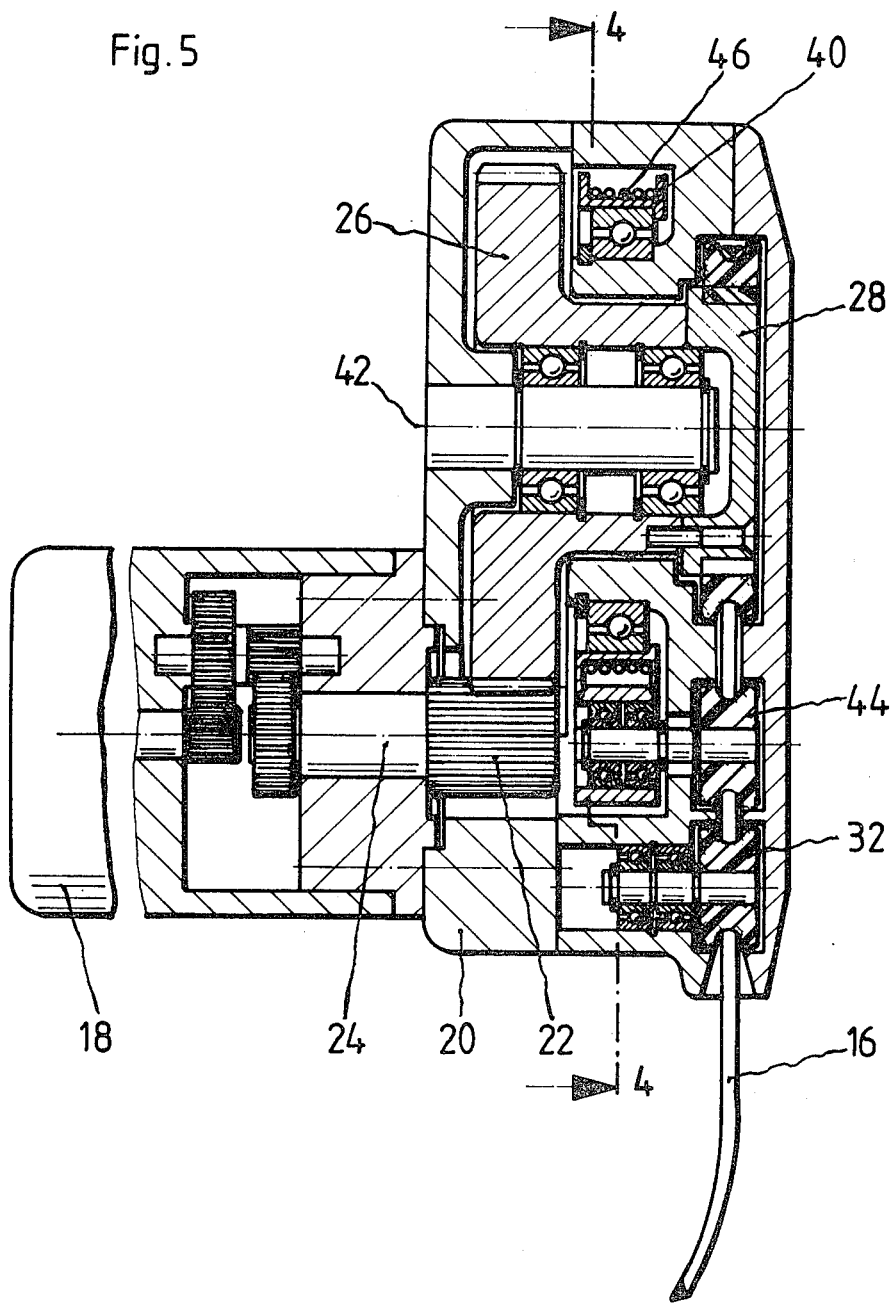

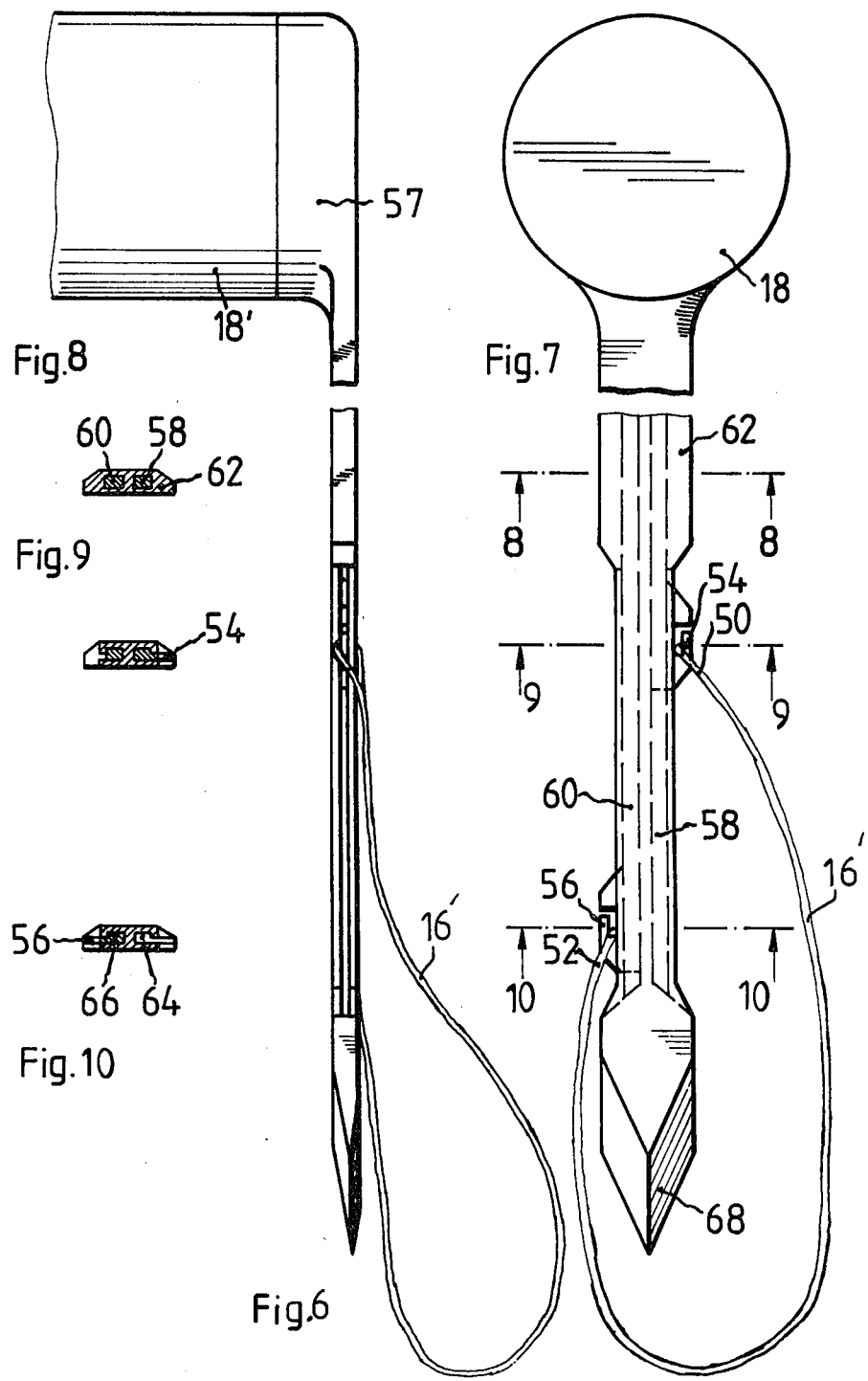

DEVICE FOR SEPARATING MEAT FROM BONES

This is a continuation-in-part of application Ser. No. 170,445 filed July 21, 1980, now abandoned the subject matter of which is incorporated herein by reference thereto.

The invention relates to a device for separating meat from bones.

There is a need for a tool in the meat industry which is suitable for removing meat from bones. A tool which would meet this requirement is not available at this time. This is due to the fact that hitherto-known separating tools were not suitable to adjust to the irregular surface shape of the bones, on the one hand, and to effectively separate the meat fibers from the bone, on the other hand.

It is therefore an object of the invention to provide a tool for separating meat from bones which is suitable for a manual, as well as a mechanical operation and which is particularly suited to follow the irregular surface shape of the bones and to separate the meat from the immediate area of the bone surface. In particular, this device should be suitable for use on sharp-angled surface edges.

This object of the invention is obtained according to the present invention by a device comprising a drive element and a flexible cutting strand which is movable in its longitudinal direction, which is unsupported over a part of its length and which is provided with spaced-apart cutting elements having cutting or knife-like edges extending in the longitudinal direction of the cutting strand.

The flexibility of the cutting strand is not impaired by the cutting elements which are spaced apart from each other, so that the cutting strand can thereby adjust to relatively sharp bends or curvatures. The cutting edges which extend in the longitudinal direction permit one to perform a drawing cut, which is required for a clean cut. Since the cutting strand is unsupported over a portion of its length, it can adjust with this unsupported portion to the area of the given surface shape of the bone. The device can be moved either manually along the bone, or it may be stationary, especially such as when removing meat from ribs, in which case the ribs which have the meat pieces, are fed stepwise along the device in a controlled manner by means of a scanning device, for example.

Other objects and features of the present invention will become apparent from the following detailed description considered in connection with the accompanying drawings, which disclose several embodiments of the invention. It is to be understood that the drawings are to be used for the purposes of illustration only, and not as a definition of the limits of the invention.

In the drawings, wherein similar reference characters denote similar elements throughout the several views:

FIG. 5 is an axial sectional view taken along the motor axis of the device shown in FIG. 4;

FIG. 6 is a partial side elevational view of another embodiment of the inventive device;

FIG. 7 is an elevational end view of the device shown in FIG. 6, taken in the direction of arrow 7 in FIG. 6;

FIG. 8 is a sectional view taken along line 8—8 of FIG. 7;

FIG. 9 is a sectional view taken along line 9—9 of FIG. 7;

FIG. 10 is a sectional view taken along line 10—10 of FIG. 7; and

Figure 2:
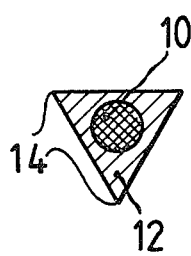
FIG. 2 is a sectional view taken along line 2—2 of FIG. 1.
Figure 1:
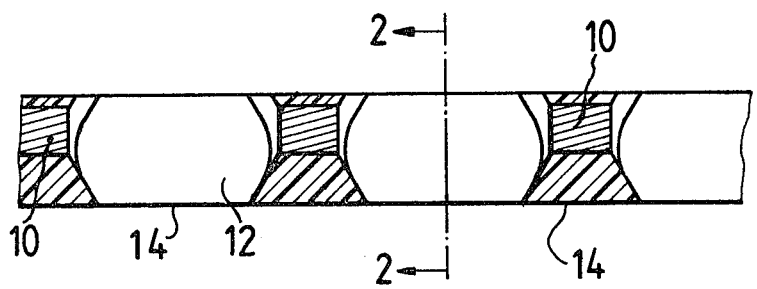
FIG. 1 is a greatly enlarged side view of a partial piece of a flexible cutting strand used in the device embodying the present invention.

Referring now in detail to the drawings, FIG. 1 shows a thread 10 which is made of a very strong, flexible material capable of withstanding alternating bending stresses. This material may be, e.g., an aromatic polyamide or a polyester. For example, a suitable polyamide is commercially available under the trademark Kevlar and which is made by Dupont, while a suitable polyester material is commercially available under the trademark TREVIRA HOCHFEST made by Hoechst AG of Germany, for example.

Figure 3:
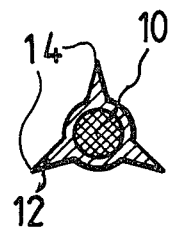
FIG. 3 is a cross sectional view taken through another embodiment of the cutting element mounted on the cutting strand corresponding to FIG. 2.

The thread 10 is covered in regular intervals with prismatic elements 12 which have a triangular shape. The prismatic elements 12 are fixedly connected with the thread 10 and consist of a hard metal, for example. Other cross-sectional shapes are possible, as is shown in FIG. 3. In any case, element 12 is provided with cutting or knife-like edges 14 which substantially extend in the longitudinal direction of the thread 10 and which permit a drawing cut during a longitudinal movement of thread 10.

Figure 4:
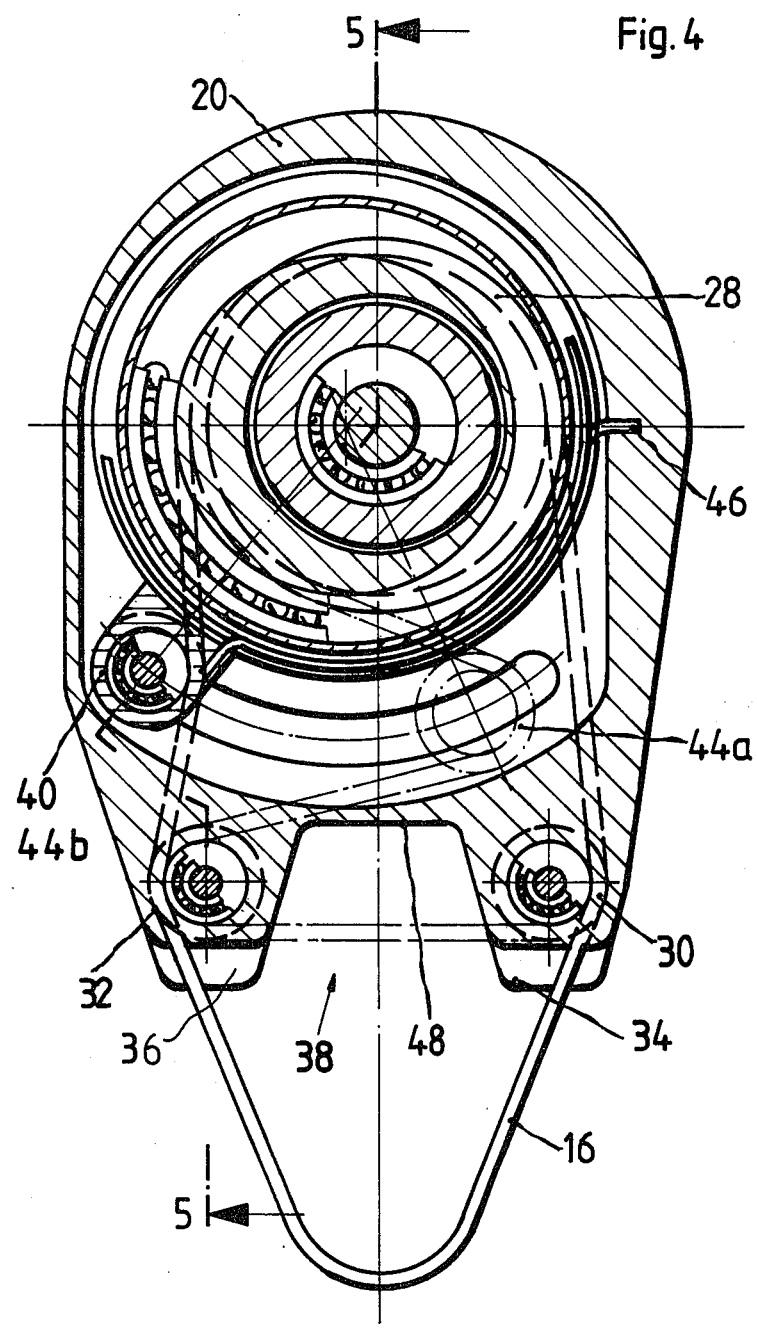
FIG. 4 is a schematic elevational end view of a device embodying the present invention.

In order to prevent meat scraps from getting stuck in the intermediary spaces between the individual elements 12, these intermediate spaces may be provided with an elastomer filler 15 which may consist of silicon or polyurethane, for example. The filler 15 has the same cross section as elements 12, so that a cutting strand, generally designated by reference numeral 16 in FIG. 4, is provided which has a unitary cross section, but which performs a cutting effect only in the area of cutting edges 14. The interruption of the cutting effect, i.e., the limitation of the cutting effect to the cutting edges 14, which are arranged at spaced-apart distances from each other in the longitudinal direction, is desirable.

The cutting strand 16 is moved by a suitable device in such a manner that it can adjust to the irregular shape of the bone surface. FIGS. 4 and 5 show one embodiment of such a device which is provided with a drive motor 18 which simultaneously serves as a handle. Motor 18 is mounted on a housing 20 into which the motor shaft 24 with the associated pinion 22 extends. The pinion 22 is in engagement with a drive wheel 26 which is mounted in housing 20 and which is fixedly connected with a drive pulley or disk 28 for cutting strand 16. Two deflection rollers 30 and 32 for the cutting strand 16 are stationarily-mounted in housing 20 in the same manner as the drive wheel 26 on respective housing shoulders 34 and 36. These housing shoulders 34 and 36 encompass therebetween a U-shaped indentation 38 of housing 20, so that the cutting strand 16 extends free and unsupported in the area of this recess of indentation 38 between the two deflection rollers 30 and 32. A tension arm 40 is concentrically-mounted with respect to the drive wheel 26 in housing 20 which carries a rotatable tension roller 44 at a radial distance from its pivot axis 42. This tension roller 44 is pretensioned against the clockwise direction relative to housing 20, by a shank or leaf spring 46 which is concentrically-disposed relative to the pivot axis 42 on the tension arm 40 so that the tension roller 44 wants to assume its rest position 44*a* shown in FIG. 4, whereby the cutting strand 16 extends in a tensioned manner between the deflection rollers 30 and 32.

During operation, the device is so arranged that the bone from which the meat is to be removed engages in the space between the cutting strand 16 and the base 48 of indentation 38. By exerting a pulling force directed downwardly on the housing 20 in FIG. 4, the cutting strand 16 is drawn against the side of the bone facing away from housing 20. Due to the tension force transmitted onto the cutting strand 16, the tension roller 44 is pivoted from its position 44*a* against the effect of shank spring 46 into the operating position 44*b* corresponding to the position of the tension arm 40, while the cutting strand 16 assumes the position shown in full lines in FIG. 4, so that it can engage on the surface of the bone. This engagement on the bone is maintained by the tension force exerted on housing 20, on the one hand, and by the effect of the shank spring 46, on the other hand.

In order to remove the meat from all sides of the bone, the device is initially moved in the longitudinal direction of the bone. Then it is necessary to change the position of the device transversely to the longitudinal movement along the bone, if need be.

The device shown in FIGS. 6 and 7, differs from the device shown in FIGS. 4 and 5, above all in that it does not have an endless cutting strand 16, but a cutting strand 16′ which is provided at each of its ends with a loop 50, 52 by which it is suspended on a hook 54, 56, respectively. The hooks 54, 56 serve to transmit a reciprocating movement to the cutting strand 16′ in contrast to the revolving or rotary movement in the device in accordance with FIGS. 4 and 5.

A suitable motor 18′ is again used as a drive which transmits a counter-reciprocating movement to two slides 58 and 60 by means of a drive 57. Such drives are known, so that the drive is not described in detail.

The slides 58 and 60 extend parallel with respect to each other on the two small sides of a tongue-like base body 62 which is connected with the motor 18′ and the drive 57. Two cut-out longitudinally-extending guides 64 and 66 are provided in the base body 62 for guiding the two slides 58 and 60 and the cross section of the slides 58 and 60 correspond to the cut-out area of the longitudinal guides 64 and 66. The longitudinal guides 64 and 66 open towards the two smaller lateral sides of the base body with a reduced cross section with respect to the cut-out area. The cross section of the hooks 54 and 56 is adjusted to this reduced cross section and the hooks extend outwardly beyond these lateral sides or edges of the base body 62.

At the end facing away from motor 18′ and drive 57, and outside of the movement range of slides 58 and 60, the base body 62 is provided with a flat tip 68 which is more bevelled on the side of the base body 62 on which the motor 18′ is mounted (which motor simultaneously serves as a manual handle), thus preventing a sliding off of the device from the bone which usually would be positioned on the side of the base body 62 facing away from the motor.

The cutting strand 16′ forms a loose loop between the two hooks 54 and 56 which is positioned around the bone. When a suitable tension force is exerted on the device, the cutting strand 16′ engages the surface of the bone, so that the meat can be removed from the bone, as already described above.

Figure 11:
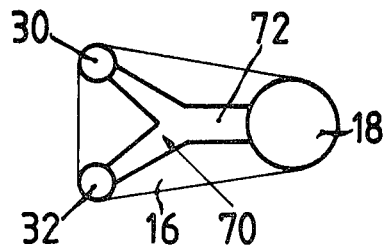
FIGS. 11-15 are schematic end views of further embodiments of the inventive device.

The schematically-shown embodiment in accordance with FIG. 11 shows a solution similar to FIG. 4 with a fork-like base body 70 which supports the deflection rollers 30 and 32 at one end and the motor 18 at its other end. However, the cutting strand extends unsupported at both sides of the fork shaft 72 over a greater length than between the deflection roller 30 and 32, so that the device can be adjusted to different operating conditions.

Figure 12:
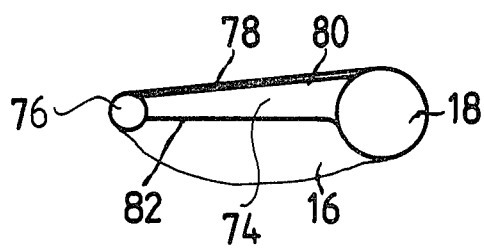

The embodiment in accordance with FIG. 12 corresponds to the embodiments in FIGS. 6 and 7, since the tongue-like base body 74 is also provided which supports on one end a drive motor 18. However, this drive motor generates a revolving or rotary movement of the endless cutting strand 16 which travels around a deflection roller 76 at the other end of the base body 74 facing away from motor 18. In this construction, the one longitudinal edge 78 of the base body 74 forms a tangent to the drive wheel which is connected with the motor and the deflection roller 76, so that the cutting strand 16 can be guided along this longitudinal axis 78 in a longitudinal guide 80. The other longitudinal edge 82 is inwardly offset with respect to the tangent between the drive wheel and the deflection roller 76 on the side opposite to longitudinal edge 80, so that the cutting strand 16 moves unsupported in this region. In this area, a bone may be inserted between the cutting strand 16 and the base body 74.

Figure 13:
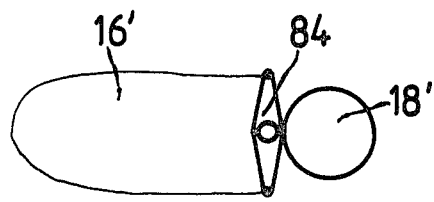
Figure 14:
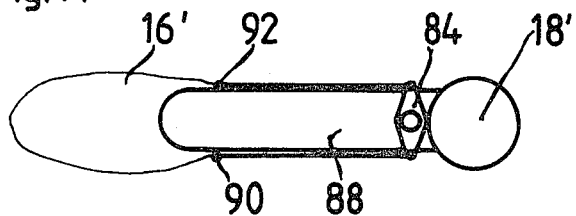
Figure 15:
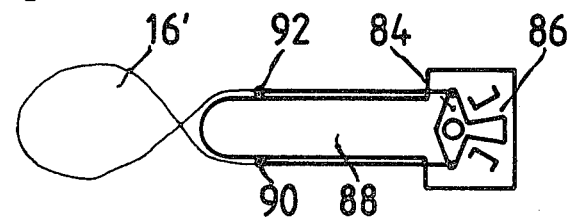

The embodiments in accordance with FIGS. 13 and 15 are related to devices with a reciprocating driven cutting strand 16′. In order to show this drive schematically, a rocker arm 84 is shown with which the cutting strand 16 is connected. In the embodiments in accordance with FIGS. 13 and 14, the rocker arm 84 is driven by a motor 18′ and a suitable drive, which may provide a larger drive force than that for the embodiment shown in FIG. 15, wherein a schematically-shown oscillating armature drive 86 is provided for the rocker arm 84.

Apart from the different design of the drive, the embodiments in accordance with FIGS. 13 to 15 differ in that, in the device design in accordance with FIG. 13, the cutting strand 16′ forms a free loop between the two ends of rocker arm 84 which may engage the bone by a suitable tension force exerted on the device. The embodiment in accordance with FIG. 14 corresponds closely to the embodiments of FIGS. 6 and 7 in that the cutting strand 16′ forms a loop in its effective operating area at the end of a tongue-like base body 88, on the one hand, while it is fixed by two oppositely mounted guide rollers 90 and 92 on the smaller sides of the base body 88, for guiding along the base body to the rocker arm 84 on the other hand. Optionally recessed guides for the cutting strand 16′ may be provided, in base body 88, if need be.

Finally, the embodiment in accordance with FIG. 15 shows a variant wherein the cutting strand 16′ can form a loop with its ends crossing over for an improved engagement with the bone.

As can be seen from the foregoing description, the inventive device can be widely varied, as long as the flexible cutting strand is provided with cutting elements spaced apart from each other which have cutting edges which run in the longitudinal direction of the cutting strand and the cutting strand is either continuously or reciprocatingly moved by a drive element and is unsupported over a portion of its length, so that the cutting strand can partially encompass a bone in this operating area.

Thus, while only several embodiments of the present invention have been shown and described, it is obvious that many changes and modifications may be made thereunto without departing from the spirit and scope of the invention.

What is claimed is:

1. A device for separating meat from bones, comprising:
   a drive element; and
   an elongated, flexible cutting strand coupled to said drive element for movement along a travel path parallel to its longitudinal direction, said strand being unsupported over a portion of its length, and being provided with spaced-apart cutting elements having their cutting edges aligned and extending in the longitudinal direction of said cutting strand.

2. The device according to claim 1, wherein said cutting strand is provided with a filler in the intermediary spaces between said cutting elements, which filler has a cross section corresponding to said cutting elements and is made from a material selected from the group consisting of an elastomer and rubber.

3. The device according to claim 1, wherein said cutting strand is an endless strand and said drive element serves to drive said strand in a revolving manner.

4. The device according to claim 1, wherein said cutting strand has two ends which are connected to said drive element and wherein said drive element generates a reciprocating movement which is imparted to said ends of said strand.

5. The device according to claim 3, additionally including a spring-loaded tension roller about which said cutting strand is guided, which roller is biased in a direction which tends to shorten the unsupported length of said cutting strand.

6. The device according to claim 3, additionally including a housing and two deflection rollers supported on said housing over which said cutting strand is guided, said strand running between said rollers in an unsupported manner at a distance from said housing supporting said deflection rollers.

7. The device according to claim 4, additionally including a tongue-like base body and wherein said cutting strand is guided at least along one side edge of said base body.

8. The device according to claim 4, additionally including a tongue-like base body having two lateral sides, and two slides each slidably received in one of said sides coupled to an opposite end of said cutting strand at one end thereof and to said drive element at the other end thereof to effect a reciprocating movement thereof.

9. The device according to claim 8, wherein said drive element includes a drive motor and wherein said tongue-like base body supports at one end thereof said drive motor on a wide lateral side thereof and has a flat tip at its other end which, on said wide side which supports the motor, is bevelled toward the end of said tip.

* * * * *